(12) United States Patent
Suzuki et al.

(10) Patent No.: US 9,186,794 B2
(45) Date of Patent: Nov. 17, 2015

(54) ROBOT CONTROLLER HAVING FUNCTION TO SIMPLIFY TEACHING OPERATION AND IMPROVE MOTION PERFORMANCE OF ROBOT

(71) Applicant: FANUC CORPORATION, Yamanashi (JP)

(72) Inventors: Hajime Suzuki, Yamanashi (JP);
Shinichi Washizu, Yamanashi (JP);
Min-Ren Jean, Rochester Hills, MI (US)

(73) Assignee: FANUC CORPORATION, Yamanashi (JP)

( * ) Notice: Subject to any disclaimer, the term of this patent is extended or adjusted under 35 U.S.C. 154(b) by 74 days.

(21) Appl. No.: 14/196,758

(22) Filed: Mar. 4, 2014

(65) Prior Publication Data

US 2015/0251312 A1 Sep. 10, 2015

(51) Int. Cl.
*G06F 19/00* (2011.01)
*G05B 19/18* (2006.01)
*B25J 9/16* (2006.01)

(52) U.S. Cl.
CPC ....... *B25J 9/163* (2013.01); *G05B 2219/39295* (2013.01); *G05B 2219/39298* (2013.01); *G05B 2219/43203* (2013.01)

(58) Field of Classification Search
USPC .................................................. 700/245–264
See application file for complete search history.

(56) References Cited

U.S. PATENT DOCUMENTS

2011/0208356 A1  8/2011  Kato et al.

FOREIGN PATENT DOCUMENTS

JP  2011-167817 A  9/2011

*Primary Examiner* — Bhavesh V Amin
(74) *Attorney, Agent, or Firm* — Hauptman Ham, LLP (57) ABSTRACT

A robot controller capable of easily speeding up the motion of a robot by learning, without using a special device and teaching know-how. The robot controller has a storing part which stores a reference motion pattern of the robot; an inputting part which designates at least one of a working start region where a motion of the robot based on the reference motion pattern is initiated and a working end region where the motion of the robot is terminated; an automatic generating part which automatically generates a plurality of motion patterns of the robot based on the reference motion pattern and divided regions formed by dividing a working region at a predetermined resolution; and a learning control part which learns a motion speed-up ratio for speeding up the motion by changing a velocity or acceleration in relation to each of the automatically generated motion patterns.

6 Claims, 6 Drawing Sheets

ROBOT CONTROLLER HAVING FUNCTION TO SIMPLIFY TEACHING OPERATION AND IMPROVE MOTION PERFORMANCE OF ROBOT

BACKGROUND OF THE INVENTION

1. Field of the Invention

The preset invention relates to a robot controller for controlling a robot, and in particular, relates to a robot controller having a function to specify a teaching operation of the robot by learning and improving motion performance of the robot.

2. Description of the Related Art

In a factory in which a system constituted by a robot and peripheral equipment is installed, a target cycle time in a production line including the system is determined. In order to achieve the target cycle time, a teaching operator carries out teaching operation by trial and error based on experience and know-how, for example, by modifying a teaching program and teaching the motion which is easily executed by the robot. In such a case, the improvement of the motion velocity of the robot depends on the skill of the operator, and the operation by the operator is inefficient and takes a long time.

In order to solve the above problem, for example, Japanese Unexamined Patent Publication (Kokai) No. 2011-167817 (JP 2011-167817 A) discloses a robot controller including an ordinary control part for controlling the motion of a robot mechanical unit; and a learning control part for operating the robot mechanical unit with a work program, and learning to calculate a learning correction value to approximate a controlled position of the robot mechanical unit detected by a sensor to a target trajectory or position given to the ordinary control part. In this case, the learning control part calculates the maximum velocity override which can be set in a learning operation condition, and calculates the learning correction value while increasing the velocity override by a plurality of times until it reaches the maximum velocity override.

In JP 2011-167817 A, by repeatedly learning the same motion, the motion velocity of the robot can be increased without depending on the skill of an operator. However, in JP 2011-167817 A, it is necessary to provide an additional sensor to the robot, in order to restrain vibration of the robot with high accuracy. Further, when the position and orientation of the robot are sequentially changed due to the condition of a workpiece, etc., it may be difficult to repeatedly learn the motion at an arbitrary position and orientation.

SUMMARY OF THE INVENTION

Therefore, an object of the present invention is to provide a robot controller capable of easily speeding up the motion of the robot by learning, without using a special device such as a sensor for restraining vibration, even when the position and orientation of the robot are changed in a given working region.

According to the present invention, there is provided a robot controller for controlling a robot which is operated in a predetermined working region while correcting a position and orientation of the robot, comprising: a storing part which stores a reference motion pattern of the robot; an inputting part which designates at least one of a working start region in which a motion of the robot based on the reference motion pattern is initiated and a working end region in which the motion of the robot based on the reference motion pattern is terminated; an automatic generating part which automatically generates a plurality of motion patterns of the robot based on the reference motion pattern stored in the storing part and divided regions formed by dividing a working region designated by the inputting part at a predetermined resolution; and a learning control part which learns a motion speed-up ratio for speeding-up the motion of the robot by changing a velocity or acceleration in relation to each motion pattern automatically generated by the automatic generating part.

In a preferred embodiment, the motion pattern of the robot includes a motion for gripping a workpiece which is positioned in the working start region at arbitrary position and orientation, and a motion for locating the gripped workpiece in the working end region.

In a preferred embodiment, the learning control part calculates the motion speed-up ratio in relation to each motion pattern, based on an allowable load of a motor for driving each axis of the robot and a load of the motor during executing the motion pattern.

In a preferred embodiment, the learning control part calculates the motion speed-up ratio in relation to each motion pattern, based on a difference between a command value and a feedback value for a motor for driving each axis of the robot.

In addition, the learning control part may search a learned motion from past learning data, before executing a regenerated motion based on the learned motion speed-up ratio, and then, when the learned motion similar to the regenerated motion exists in the past learning data, the learning control part may correct the motion speed-up ratio of the regenerated motion based on and the motion speed-up ratio associated with the learned motion and a difference between motion information of the regenerated motion and the learned motion.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
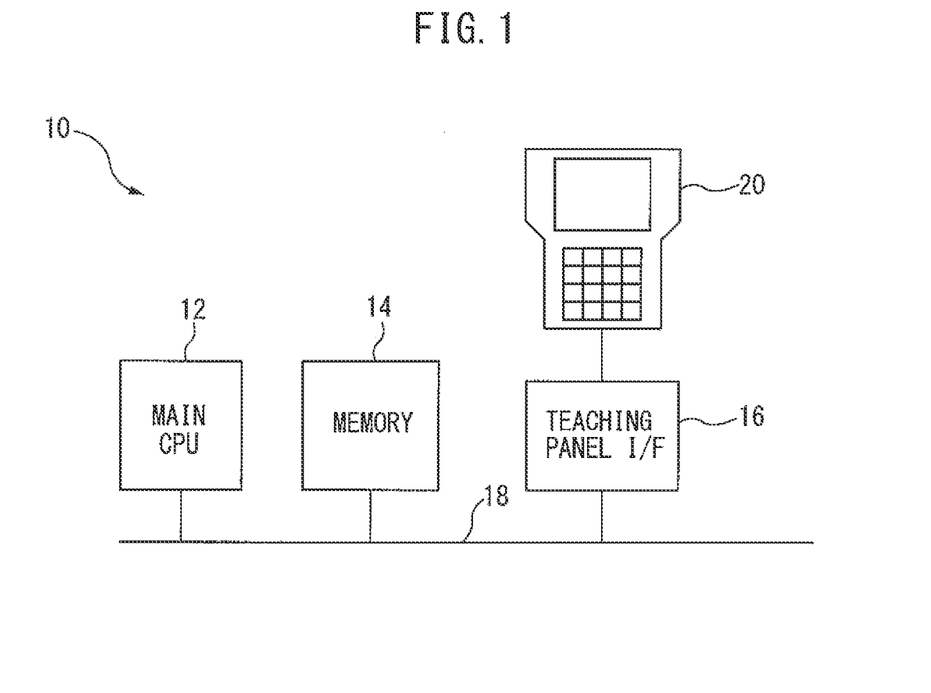
FIG. 1 shows an internal constitution of a robot controller according to a preferred embodiment of the invention.

FIG. 1 is a view showing an internal constitution of a robot controller 10 according to a preferred embodiment of the invention. Controller 10 includes a main CPU 12; a memory 14 including a read-only memory (ROM), a volatile memory and a non-volatile memory; and a teaching panel interface (I/F) 16, wherein these components are connected in parallel to each other by means of a bus 18. A teaching panel 20 is connected to interface 16, whereby an operator can generate a motion program and input a working region, etc., by using teaching panel 20. A procedure for extracting a reference motion pattern, generating a motion pattern and learning the motion, etc., is carried out by main CPU 12.

The robot controller of the present invention controls a robot which is operated in a predetermined working region while correcting the position and orientation of the robot. The robot controller includes a storing part which stores a reference motion pattern of the robot; an inputting part which designates at least one of a working start region in which a motion of the robot based on the reference motion pattern is initiated and a working end region in which the motion of the robot based on the reference motion pattern is terminated; an automatic generating part which automatically generates a plurality of motion patterns of the robot based on the reference motion pattern stored in the storing part and divided regions formed by dividing a working region designated by the inputting part at a predetermined resolution; and a learning control part which learns a motion speed-up ratio for speeding-up the motion of the robot by changing a velocity or acceleration in relation to each motion pattern automatically generated by the automatic generating part. In this embodiment, memory 14 corresponds to the storing part, and teaching panel 20 corresponds to the inputting part, and main CPU 12 corresponds to the automatic generating part and the learning control part.

Figure 2:
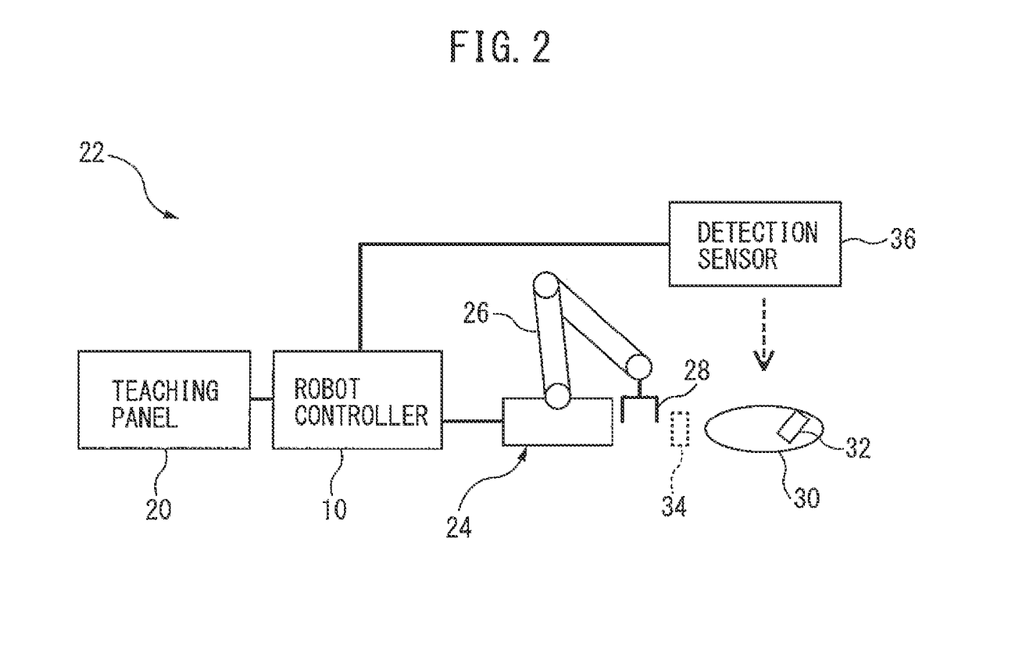
FIG. 2 shows a schematic constitution of a robot system including the robot controller of FIG. 1.

FIG. 2 exemplifies a schematic constitution of a robot system 22 including robot controller 10. Robot system 22 includes robot controller 10, teaching panel 20, and a robot 24 controlled by robot controller 10. For example, robot 24 is a multi-joint robot having six axes, and has a robot arm 26 and a hand 28 attached to a front end of robot arm 26. In the example of FIG. 2, robot 24 can hold or grip a workpiece 32 positioned within a predetermined working region 30 at arbitrary position and orientation, by means of hand 28, and then move the gripped workpiece to a predetermined delivery place out of working region 30.

Robot system 22 is connected to robot controller 10, and has a sensor 36 for detecting the position and orientation of workpiece 32 within working region 30. Robot controller 10 can calculate an amount of correction for correcting the motion of robot 24 (i.e., the position and orientation of the robot at micro time intervals), based on a detection result of sensor 36. For example, sensor 36 may be a vision sensor having a camera capable of capturing a part or entirety of working region 30.

Figure 3:
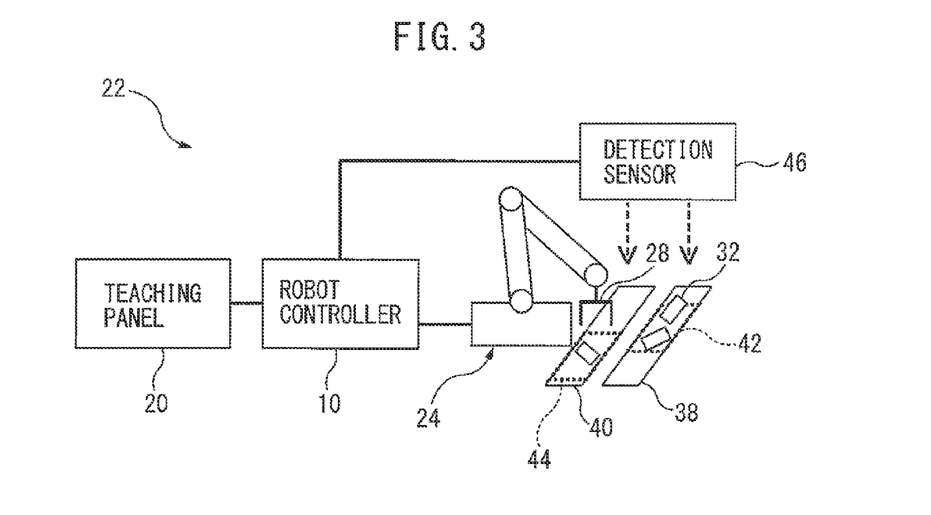
FIG. 3 shows a schematic constitution of a robot system including the robot controller of FIG. 1, wherein the robot system is used for an application different from FIG. 2.

FIG. 3 shows the schematic constitution of robot system 22, wherein robot system 22 is used for an application different from FIG. 2. In the example of FIG. 3, robot 24 can hold or grip a workpiece 32 conveyed by a supply conveyor 38, by means of hand 28, and then locate the gripped workpiece onto an eject conveyor 40. Robot system 22 is connected to robot controller 10, and has a sensor 46 for detecting the position and orientation of workpiece 32 when gripping the workpiece within a predetermined working region 42 on supply conveyor 38 and when locating the workpiece onto a predetermined working region 44 on eject conveyor 40. Robot controller 10 can calculate an amount of correction for correcting the motion of robot 24 (i.e., the position and orientation of the robot at micro time intervals), based on a detection result of sensor 46. For example, sensor 46 may be a vision sensor and an encoder.

The movement of hand 28 in robot system 22 of FIGS. 2 and 3 is carried out by controlling a motor (preferably, a servomotor) for driving each axis of robot 24 by means of robot controller 10. The volatile memory of storing part 14 may store motion information including at least one of the velocity, acceleration, torque and error of the motor during executing the motion of the robot, which is temporarily required for the learning. The ROM of storing part 14 may store predetermined allowable values of the velocity, acceleration, torque and error of the motor. Further, the non-volatile memory of storing part 14 may store learning data such as a motion speed-up ratio calculated in the learning process (described below).

Figure 4:
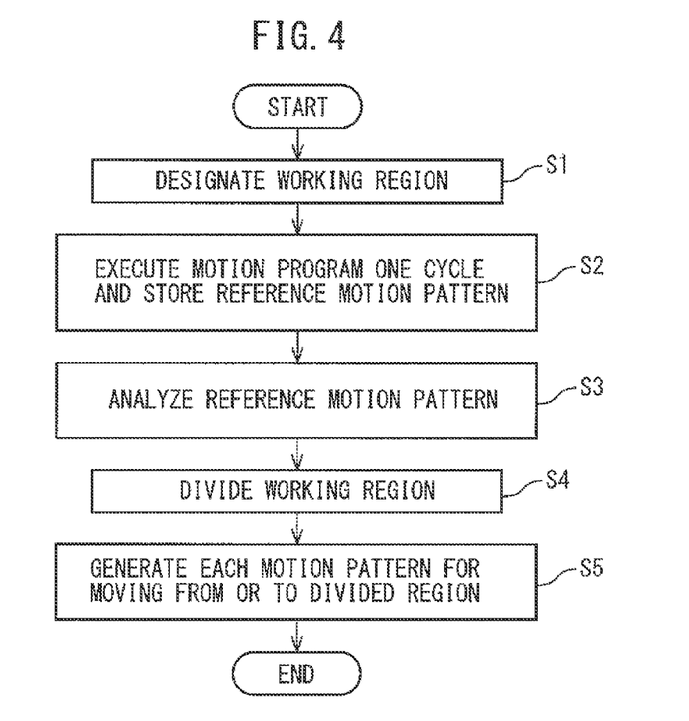
FIG. 4 is a flowchart showing an example of a procedure for automatically generating the motion of a robot in the robot system of FIG. 2 or 3.

Next, an example of a procedure for automatically generating the motion of the robot in robot system 22 of FIG. 2 or 3 is explained with reference to a flowchart of FIG. 4.

First, in step S1, each working region is input (or set). Concretely, the operator may input information regarding the working region (working region 30 in the example of FIG. 2, and working regions 42, 44 in the example of FIG. 3) such as the position, shape and size of the working region into robot controller 10 by means of teaching panel 20.

In this regard, the "working region" herein means a region where the robot carries out a given operation (motion) while correcting the position and orientation of the robot. Further, the working region includes at least one of a working start region in which the motion is initiated and a working end region in which the motion is terminated. For example, in the example of FIG. 2, one region 30 where the workpiece is picked (or gripped) corresponds to the working region, and in the example of FIG. 3, two regions, i.e., working region 42 where the workpiece is picked up and working region 44 where the workpiece is located, correspond to the working region. In addition, with each motion for correcting the position and orientation of the robot, the corresponding working region is associated. In step S1, the range of the region is previously input in relation to each working region.

Next, in step S2, a reference motion pattern in the motion program to be learned is stored. Concretely, robot controller 10 stores the reference motion pattern of the motion to be learned, by executing the motion program to be learned. In the motion program, although the position and orientation regarding the motion of robot 24 are corrected based on the position and orientation of workpiece 32 detected by sensor 36 or 46, it is sufficient that the motion program be executed only one cycle regardless of the position and orientation of workpiece 32.

In this regard, the "reference motion pattern" herein means a motion pattern constituted by one or more motions of the robot for carrying out a given operation. Typically, a series of motions, from starting to terminating of the motion during executing the motion program, is store as one unit of the reference motion pattern. In the examples of FIGS. 2 and 3, two reference motion patterns, i.e., the motion for moving from a pick-up position to a locate position of the workpiece, and the motion for moving from the locate position to the pick-up position, are stored.

Next, in step S3, the reference motion pattern is analyzed. Concretely, it is judged as to whether the determined working region is associated with each motion constituting the reference motion pattern. When the working region is associated, the working region is divided at a predetermined resolution so as to generate a plurality of divided regions (step S4).

Finally, in step S5, the an amount of correction for the position and orientation of the robot is calculated so that the robot at predetermined position and orientation can picks up and locate the workpiece in each divided region, the reference motion pattern is corrected by using the amount of correction, and a motion pattern for carrying out the picking motion or the locating motion is generated. Concretely, in order to learn the motion to be executed when workpiece 32 is positioned at an arbitrary divided region, an amount of change in the position and orientation of the robot to be corrected when workpiece 32 is detected by sensor 36 or 46 is calculated, and the corrected motion pattern is generated by using the amount of change. By virtue of this, each motion pattern of the robot is automatically generated.

As described above, the generated motion pattern corresponds to a motion wherein the workpiece virtually exists on an arbitrary divided region. Therefore, the motion, equivalent to a motion wherein an actual workpiece is positioned at an arbitrary divided region and the motion program is executed, can be carried out. In other words, in the invention, an arbitrary motion pattern executed by the motion program can be learned without depending on the actual position and orientation of the workpiece.

Figure 5:
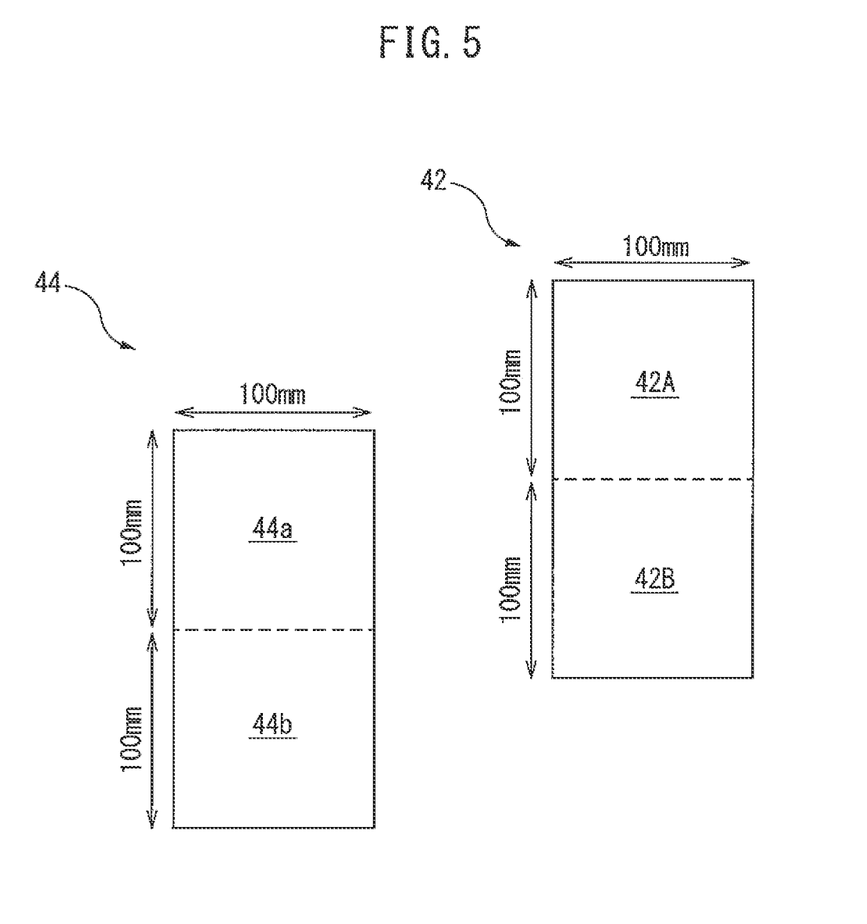
FIG. 5 shows an example of a dividing manner of a working region in the robot system of FIG. 3.

FIG. 5 shows an example of a dividing manner of the working region in the robot system of FIG. 3, wherein a resolution of the dividing is 100 millimeters, and each of working regions 42 and 44 is a rectangular region having a length of 200 millimeters and a width of 100 millimeters. In more detail, working region 42 is divided into two regions 42A and 42B, and working region 44 is divided into two regions 44a and 44b. In this case, in order to cover all patterns including the picking and locating motion between each divided region, eight motion patterns (i.e., the picking motions and the locating motions between "regions 42A and 44a," "regions 42A and 44b," "regions 42B and 44a" and "regions 42B and 44b") are generated. As another example, when a particular divided region exit wherein the frequency of movement of the robot is relatively low, the time and memory required for the learning can be saved by not generating the picking and locating motion pattern in the particular divided region. Regarding the resolution in dividing the region, as the resolution (or the number of the divided regions) is increased, the motion performance by the learning is improved. On the other hand, as the resolution (or the number of the divided regions) is decreased, the time and memory required for the learning can be saved.

Figure 6:
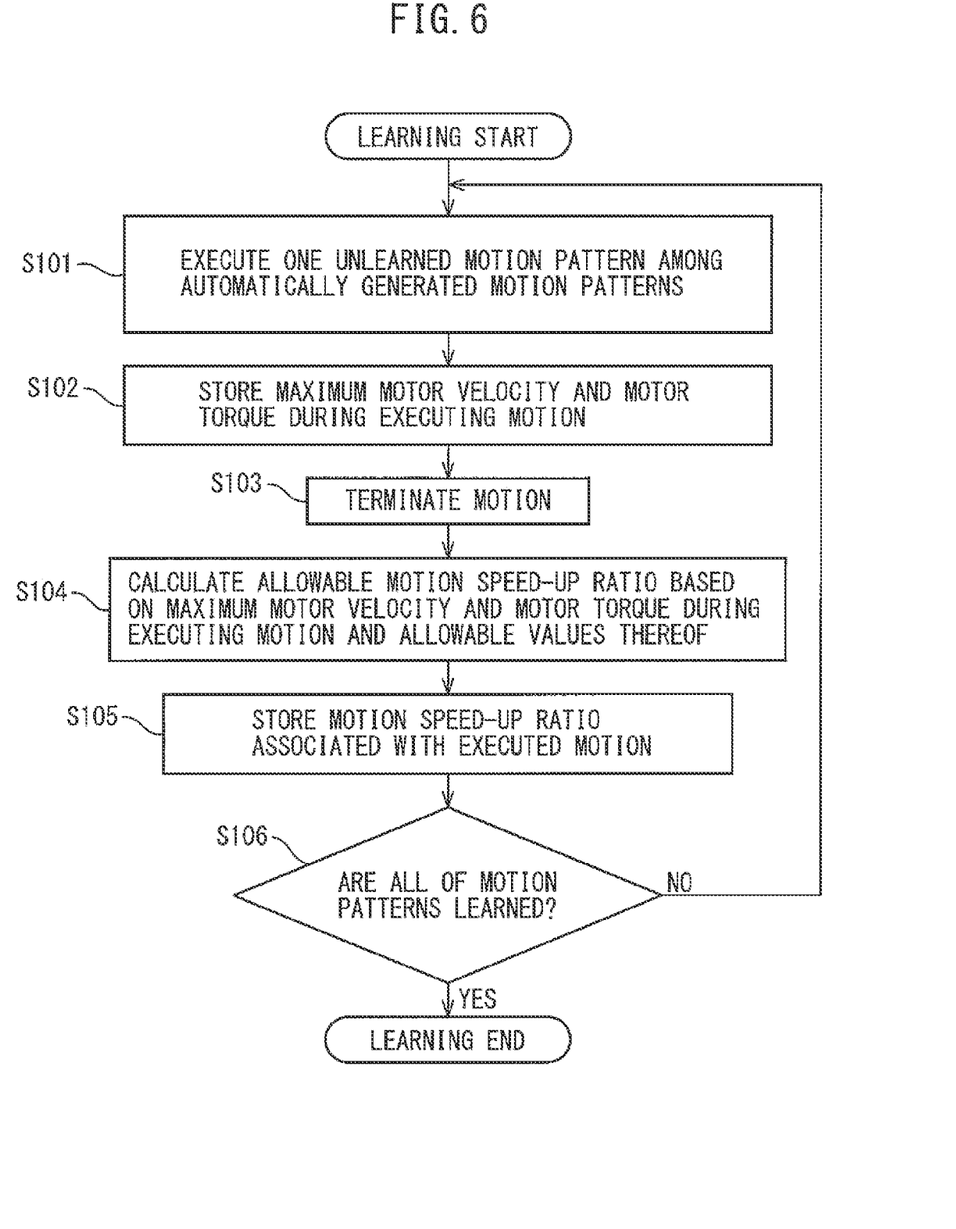
FIG. 6 is a flowchart explaining an example of a learning procedure in the present invention.

FIG. 6 is a flowchart explaining an example of the learning procedure in the present invention. First, in step S101, one unlearned motion pattern is selected from the plurality of motion patterns automatically generated by the above procedure, and the selected motion pattern is executed.

Next, in step S102, motion information (in this case, the maximum value of the motor velocity ($\omega\_max_j$) and the maximum value of the motor torque ($\tau\_max_j$) of each axis of the robot) of the unlearned motion pattern, during executing the unlearned motion pattern, is stored. In this regard, the character "j" means an axis number of each axis, for example, when the robot is a multi-joint robot having six axes, j=1 to 6.

When the executing of the unlearned motion pattern is terminated (step S103), the maximum value $\alpha_{max}$ of a motion speed-up ratio $\alpha$ capable of being set in relation to the unlearned motion pattern is calculated, based on the stored maximum values of the motor velocity and the motor torque (step S104). In this regard, motion speed-up ratio $\alpha$ is a benchmark operating the robot so as to satisfy equation (2), when the relationship between an elapsed time t and a target motor angle (or a command angle) θ before speeding up of the motion is represented by equation (1).

$$\theta = f(t)(0 \le t \le t_{max}) \quad (1)$$

$$\theta = f(\alpha t)\left(0 \le t \le \frac{t_{max}}{\alpha}\right) \quad (2)$$

In the above equations, the motor velocity is proportional to α, and the motor torque is proportional to the square of α.

Therefore, allowable maximum value $\alpha_{max}$ of the motion speed-up ratio is represented by equation (3). In this regard, "$\omega\_alw_j$" is an allowable value of the motor velocity of each axis, and "$\tau\_alw_j$" is an allowable value of the motor torque of each axis.

$$\alpha_{max} = \min\left(\frac{\omega\_alw_j}{\omega\_max_j}, \sqrt{\frac{\tau\_alw_j}{\tau\_max_j}}\right) \quad (3)$$

Next, in step S105, calculated motion speed-up ratio α is stored in the memory while the ratio is associated with the motion pattern. Such learning of the motion speed-up ratio is carried out in relation to all of the generated motion patterns. As one effect due to the learning procedure as shown in FIG. 6, the motion speed is increased while limiting the load of the robot (or a robot mechanical unit) to less than an allowable value.

Figure 7:
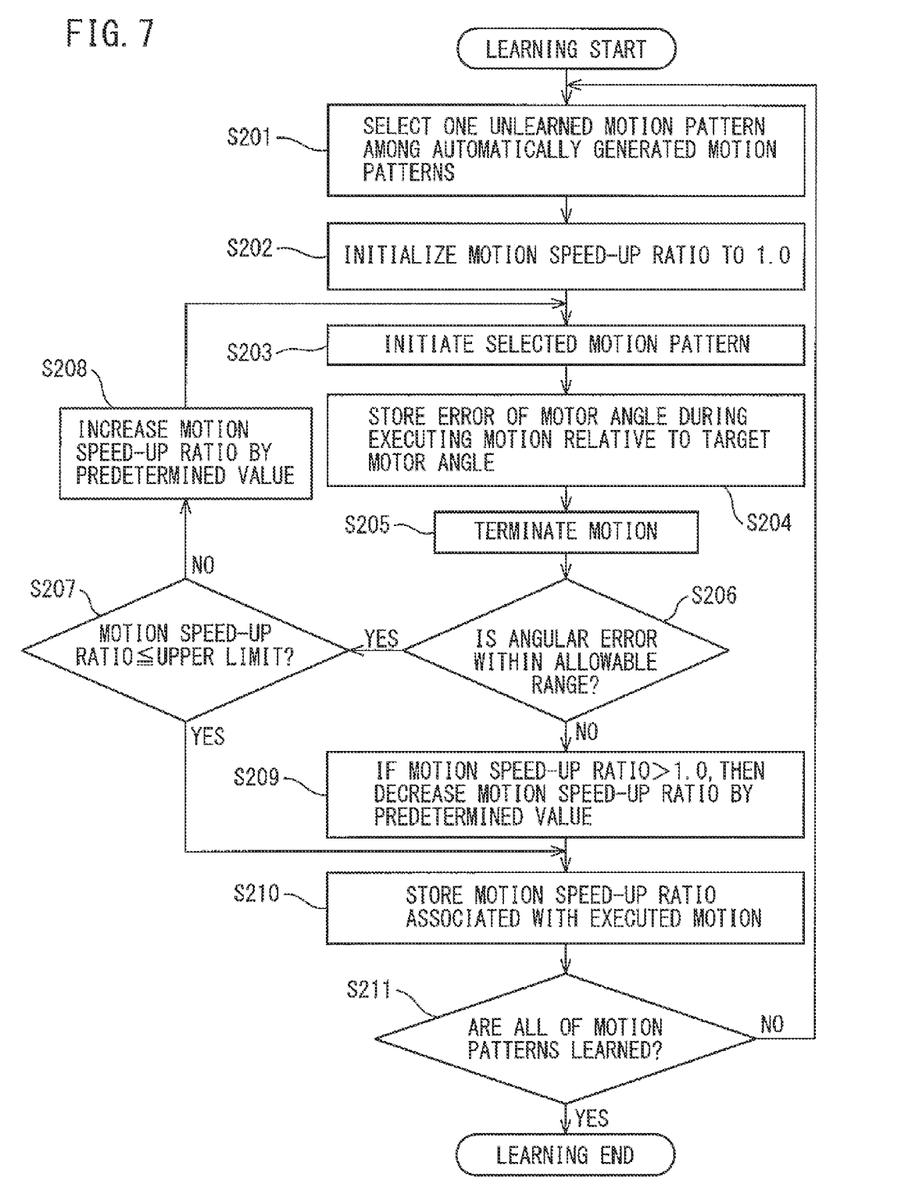
FIG. 7 is a flowchart explaining another example of a learning procedure in the present invention.

FIG. 7 is a flowchart explaining another example of the learning procedure in the present invention. First, in step S201, one unlearned motion pattern is selected from the plurality of motion patterns automatically generated by the above procedure. Then, in step S202, the motion speed-up ratio when executing the selected motion pattern is initialized to 1.0.

Next, the motion of the selected motion pattern is initiated (step S203), and motion information (in this case, a difference between a command value (or a target value) and an actual value (or a feedback value) of the motor angle of each axis) during executing the motion pattern is stored (step S204).

When the executing of the selected motion pattern is terminated (step S205), it is judged as to whether the stored angular difference is more than an allowable value (or an allowable angular error) which has been set in relation to each axis (step S206). When the angular difference is equal to or less than the allowable angular error, it is judged as to whether motion speed-up ratio α reaches a predetermined upper limit or not (step S207). When motion speed-up ratio α does not reach the upper limit, motion speed-up ratio α is increased by a predetermined value (step S208), and the same motion pattern is executed by using the increased motion speed-up ratio.

On the other hand, when the angular difference exceeds the allowable angular error in step S206, motion speed-up ratio α is decreased by a predetermined value if motion speed-up ratio α exceeds 1.0 (step S209), and then the decreased motion speed-up ratio is stored in the memory while the decreased motion speed-up ratio is associated with the executed motion pattern (step S210). Also, when motion speed-up ratio α reaches or exceeds the predetermined upper limit in step S207, the procedure progresses to step S210, wherein motion speed-up ratio α is stored in the memory while motion speed-up ratio α is associated with the executed motion pattern.

Such learning of the motion speed-up ratio is carried out in relation to all of the generated motion patterns (S211). As one effect due to the learning procedure as shown in FIG. 7, the motion speed is increased while limiting the vibration of the motor to less than an allowable value.

Figure 8:
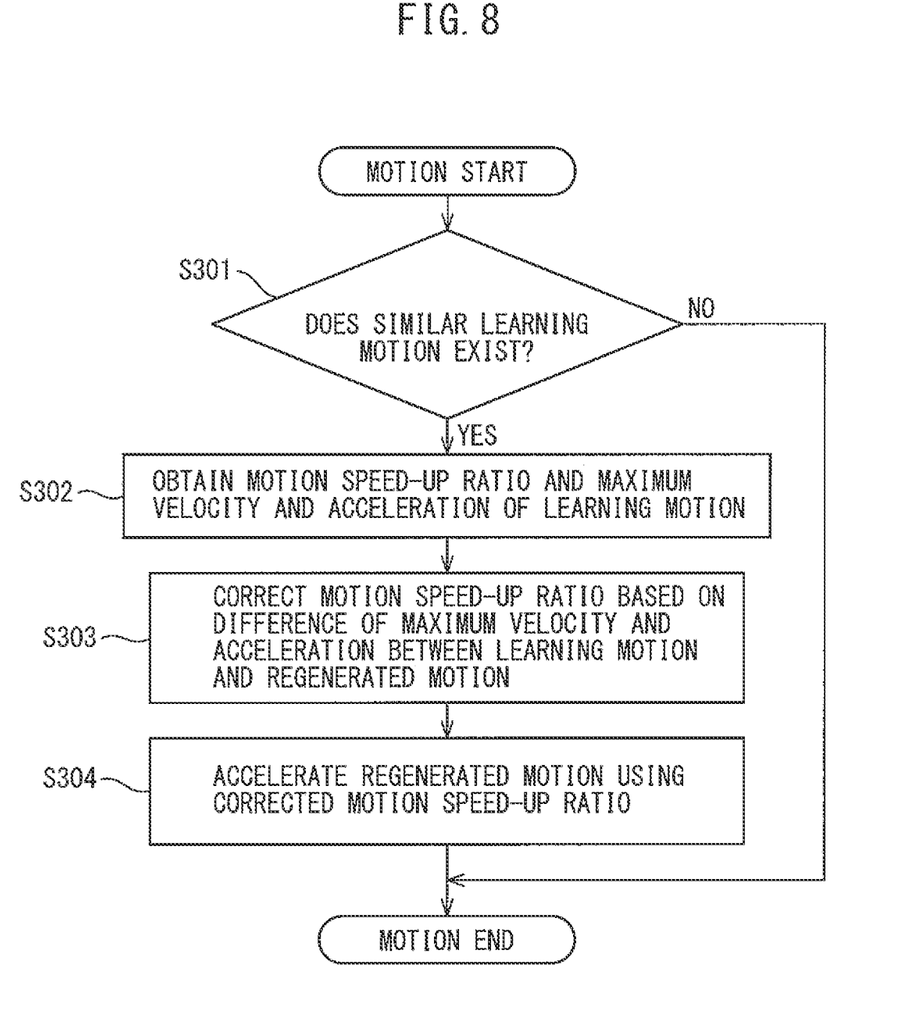
FIG. 8 is a flowchart explaining an example of a procedure for correcting a motion speed-up ratio.

FIG. 8 is a flowchart explaining an example of a procedure for correcting the motion speed-up ratio.

In the learning as exemplified in FIGS. 6 and 7, the maximum velocity "v" and maximum acceleration "a" before speeding up of the motion are previously stored, as well as motion speed-up ratio α. Maximum velocity "v" and maximum acceleration "a" are calculated at the time of motion planning, i.e., are known values before actually executing the motion.

First, in step S301, before executing a motion based on the motion program after each motion pattern is learned (hereinafter, such a motion is referred to as a "regenerated motion"), it is searched as to whether a motion, similar to the regenerated motion, exists in the past learning data stored in the memory. In this regard, a motion similar to the regenerated motion (hereinafter, such a motion is referred to as a "learned motion") means a motion wherein the difference between the position and orientation of the robot in the regenerated motion and the learned motion, at the time of starting and terminating of the motion, is within a predetermined range of resolution.

As a result of the search for the learned motion, when the motion (or the learned motion) similar to the motion to be executed (or the regenerated motion) exists, maximum motion speed-up ratio $\alpha_{max}$ associated with the learned motion, maximum velocity "v" and maximum acceleration "a" before speeding up the motion, are obtained (step S302).

Before speeding up the motion, it is not always true that the maximum velocity and the maximum acceleration of the learned motion are equal to those of the regenerated motion. Thus, when the regenerated motion is speeded up by using motion speed-up ratio $\alpha_{max}$, the motor velocity, motor torque and/or the angular error may considerably exceed the corresponding allowable value. Therefore, in the next step S303, in view of the difference between the regenerated motion and the learned motion in relation to the maximum velocity and the maximum acceleration before speeding up the motion, motion speed-up ratio $\alpha_{max}$ of the learned motion is corrected to a motion speed-up ratio $\alpha'_{max}$ for the regenerated motion.

Concretely, motion speed-up ratio $\alpha'_{max}$ is represented by equation (4), wherein the maximum velocity and the maximum acceleration of the regenerated motion before speeding up the motion are represented by "V" and "A," respectively.

$$\alpha'_{max} = \min\left(\alpha_{max} \times \frac{v}{V}, \alpha_{max} \times \sqrt{\frac{a}{A}}\right) \quad (4)$$

By virtue of equation (4), the motion speed-up ratio is corrected so that maximum velocity V and maximum acceleration A of the regenerated motion when speeding up the regenerated motion are close to velocity "v" and acceleration "a" of the learned motion when speeding up the learned motion.

Finally, in step S304, the motion is speeded up by using corrected motion speed-up ratio $\alpha'_{max}$.

Normally, the "position and orientation" of the workpiece used herein mean both of the position and the orientation of the workpiece. However, when a change in the orientation of the workpiece does not affect the motion of the robot (for example, when the workpiece is a circular disk or a sphere), the "position and orientation" of the workpiece may mean the position of the workpiece only.

In the learning of an actual production line, etc., it is difficult to learn all motions of the robot when the motion of the robot is varied depending on the position and orientation of the workpiece. However, in the present invention, the motion, which covers the entire working region designated by the user, can be automatically generated, whereby all motions, which may be used in the actual field, can be easily learned without being affected by the condition of the workpiece. Therefore, teaching adjustment operation at the actual field can be easily carried out in a short time, and production efficiency can be improved by speeding up the motion.

In the learning, by obtaining the load of the robot (mechanical unit) and vibration information of the motor during the motion, the motion can be speeded up while the allowable value of the load of the robot (mechanical unit) is satisfied and the vibration is within an allowable range.

Further, in the present invention, since a special apparatus such as a sensor for restricting vibration is not necessary, it is not necessary to attach the sensor to the robot and to carry out setting thereof. Therefore, the teaching operation can be easily carried out in a short time.

According to the present invention, an arbitrary motion to be learned can be carried out in relation to the motion wherein the position and orientation of the robot are indeterminately changed in the working region. Therefore, man-hours for the learning can be reduced. Further, by automatically identifying judging the working region which is set, by appropriately dividing the region into divided regions, and by repeatedly executing the motion moving between each divided region, the teaching can be simplified without depending on experience or know-how of the teaching operator.

The invention claimed is:

1. A robot controller for controlling a robot which is operated in a predetermined working region while correcting a position and orientation of the robot, comprising:
a storing part which stores a reference motion pattern of the robot;
an inputting part which designates at least one of a working start region in which a motion of the robot based on the reference motion pattern is initiated and a working end region in which the motion of the robot based on the reference motion pattern is terminated;
an automatic generating part which automatically generates a plurality of motion patterns of the robot based on the reference motion pattern stored in the storing part and divided regions formed by dividing a working region designated by the inputting part at a predetermined resolution; and
a learning control part which learns a motion speed-up ratio for speeding-up the motion of the robot by changing a velocity or acceleration in relation to each motion pattern automatically generated by the automatic generating part.

2. The robot controller as set forth in claim 1, wherein the motion pattern of the robot includes a motion for gripping a workpiece which is positioned in the working start region at arbitrary position and orientation, and a motion for locating the gripped workpiece in the working end region.

3. The robot controller as set forth in claim 1, wherein the learning control part calculates the motion speed-up ratio in relation to each motion pattern, based on an allowable load of a motor for driving each axis of the robot and a load of the motor during executing the motion pattern.

4. The robot controller as set forth in claim 1, wherein the learning control part calculates the motion speed-up ratio in relation to each motion pattern, based on a difference between a command value and a feedback value for a motor for driving each axis of the robot.

5. The robot controller as set forth in claim 3, wherein the learning control part searches a learned motion from past learning data, before executing a regenerated motion based on the learned motion speed-up ratio, and then, when the learned motion similar to the regenerated motion exists in the past learning data, the learning control part corrects the motion speed-up ratio of the regenerated motion based on and the motion speed-up ratio associated with the learned motion and a difference between motion information of the regenerated motion and the learned motion.

6. The robot controller as set forth in claim 4, wherein the learning control part searches a learned motion from past learning data, before executing a regenerated motion based on the learned motion speed-up ratio, and then, when the learned motion similar to the regenerated motion exists in the past learning data, the learning control part corrects the motion speed-up ratio of the regenerated motion based on and the motion speed-up ratio associated with the learned motion and a difference between motion information of the regenerated motion and the learned motion.

* * * * *